(12) United States Patent
Blädel et al.

(10) Patent No.: US 7,358,296 B2
(45) Date of Patent: Apr. 15, 2008

(54) AQUEOUS DISPERSIONS OF FLUOROPOLYMERS

(75) Inventors: Hermann Blädel, Emmerting (DE); Klaus Hintzer, Kastl (DE); Gernot Löhr, Burgkirchen (DE); Werner Schwertfeger, Altötting (DE); Reinhard Albert Sulzbach, Burghausen (DE)

(73) Assignee: 3M Innovative Properties Company, St. Paul, MN (US)

( * ) Notice: Subject to any disclaimer, the term of this patent is extended or adjusted under 35 U.S.C. 154(b) by 263 days.

(21) Appl. No.: 10/970,973

(22) Filed: Oct. 21, 2004

(65) Prior Publication Data

US 2005/0113507 A1    May 26, 2005

Related U.S. Application Data

(62) Division of application No. 09/857,081, filed as application No. PCT/EP99/09500 on Dec. 4, 1999.

(30) Foreign Application Priority Data

Dec. 11, 1998 (DE) ................. 198 57 111

(51) Int. Cl.
*C08K 3/00* (2006.01)

(52) U.S. Cl. ............... 524/544; 523/310; 524/700; 524/805; 526/249; 526/250

(58) Field of Classification Search ......... 524/544, 524/700, 805; 523/310; 526/249, 250
See application file for complete search history.

(56) References Cited

U.S. PATENT DOCUMENTS

| | | | |
|---|---|---|---|
| 2,559,752 A | 7/1951 | Berry | |
| 2,863,889 A | 12/1958 | Marks | |
| 3,009,892 A | 11/1961 | Duddington et al. | |
| 3,037,953 A | 6/1962 | Marks et al. | |
| 3,142,665 A | 7/1964 | Cardinal et al. | |
| 3,316,201 A | 4/1967 | Hahn et al. | |
| 3,536,643 A | 10/1970 | Stryker et al. | |
| 3,882,153 A * | 5/1975 | Seki et al. | 554/184 |
| 4,282,162 A * | 8/1981 | Kuhls | 554/185 |
| 4,369,266 A | 1/1983 | Kuhls et al. | |
| 4,391,940 A | 7/1983 | Kuhls et al. | |
| 4,623,487 A * | 11/1986 | Cope | 554/185 |
| 4,864,006 A | 9/1989 | Giannetti et al. | |
| 5,296,165 A * | 3/1994 | Shimizu et al. | 516/77 |
| 5,463,021 A | 10/1995 | Beyer et al. | |
| 5,464,897 A | 11/1995 | Das et al. | |
| 5,576,381 A | 11/1996 | Bladel et al. | |
| 5,667,772 A | 9/1997 | Zastrow et al. | |
| 5,955,556 A * | 9/1999 | McCarthy et al. | 526/249 |
| 5,973,091 A | 10/1999 | Schmiegel | |
| 5,990,330 A | 11/1999 | Sulzbach et al. | |
| 6,174,979 B1 * | 1/2001 | Biancardi et al. | 526/247 |
| 6,395,848 B1 | 5/2002 | Morgan et al. | |
| 6,518,442 B1 | 2/2003 | Felix et al. | |
| 6,613,941 B1 | 9/2003 | Felix et al. | |
| 6,706,193 B1 * | 3/2004 | Burkard et al. | 210/662 |
| 6,720,360 B1 | 4/2004 | Grootaert et al. | |
| 6,825,250 B2 | 11/2004 | Epsch et al. | |
| 6,833,403 B1 * | 12/2004 | Bladel et al. | 524/458 |

FOREIGN PATENT DOCUMENTS

| | | |
|---|---|---|
| EP | 0 194 690 A2 | 9/1986 |
| EP | 0 408 363 A2 | 1/1991 |
| EP | 0 721 974 A1 | 7/1996 |
| EP | 0 739 960 A1 | 10/1996 |
| EP | 0 743 347 A2 | 11/1996 |
| EP | 0 818 506 A1 | 1/1998 |
| EP | 0 822 175 A2 | 4/1998 |
| EP | 1209125 A2 | 5/2002 |
| GB | 1 067 068 | 5/1967 |
| GB | 1 329 049 | 9/1973 |
| WO | WO 97/08214 | 3/1997 |
| WO | WO-00/35971 * | 6/2000 |
| WO | WO 01/57100 A1 | 8/2001 |

OTHER PUBLICATIONS

"Encyclopedia of Industrial Chemistry Analysis", vol. 1, pp. 339 to 340, Interscience Publisher, New York, NY, 1971.
"Modern Fluoropolymers", John Wiley & Sons, Chichester (1997), pp. 227-228, 244.
"Nonionic Surfactants", edited by M.J. Schick, Marcel Dekker, Inc., New York, 1967.
El-Aaser Mohamed S., "Methods of Latex Cleaning", *Science and Technology of Polymer Colloids*, vol. II, pp. 422-448 (1983).
Lowry, Thomas H. and Richardson, Kathleen S., Book: "Mechanism and Theory in Organic Chemistry", 1976, Harper & Row, Publishers, N.Y.; See chapter 3, pp. 126-129 and 156-158.

* cited by examiner

*Primary Examiner*—Peter D Mulcahy
*Assistant Examiner*—Henry S. Hu
(74) *Attorney, Agent, or Firm*—Brian E. Szymanski

(57) ABSTRACT

Fluorine-containing emulsifiers can be removed from fluoropolymer dispersions by adding to the dispersion a non ionic emulsifier, removing the fluorine-containing emulsifier by contact with an anion exchanger and separating the dispersion from the anion exchanger. The resulting dispersions can be concentrated and used for coating applications.

12 Claims, No Drawings

AQUEOUS DISPERSIONS OF FLUOROPOLYMERS

CROSS REFERENCE TO RELATED APPLICATIONS

This application is a divisional application of application Ser. No. 09/857,081, filed on May 31, 2001, now allowed, which was a national stage filing under 35 U.S.C. 371 of PCT/EP99/09500 filed Dec. 4, 1999, which International Application was published as WO 00/35971, and which claims priority to DE 198 57 111.9, filed Dec. 11, 1998.

The invention is concerned with aqueous dispersions of fluoropolymers being essentially free of fluorine-containing emulsifiers, a process for preparing such dispersions and their use. "Essentially free" means a content of less than 100 ppm, preferably less than 50 ppm, especially less than 25 ppm and in particular less than 5 ppm.

Polyfluoroethylene-dispersions find wide applications in the coating industry due to the unique performance of the coatings in respect of e.g. release properties, good weathering resistance, and flame retardancy. They are mainly used for coating kitchenware, chemical apparatus and glass fabrics. In many such applications, the dispersions are applied at relatively high solids contents, e.g., up to 70% by weight. These concentrated dispersions are mainly stabilized by nonionic emulsifiers such as alkylarylpolyethoxy alcohols and alkylpolyethoxy alcohols, using colloid-chemistry methods.

There are in principle two different polymerization processes for preparing fluoropolymers, namely suspension polymerization leading to polymer granules and, on the other hand the process known as emulsion polymerization, leading to an aqueous colloidal dispersion. This invention concerns emulsion polymerization, the resultant dispersions and their use.

The manufacturing of such dispersions involves in principle the two processing steps polymerization and concentration.

Polymers which are obtainable by aqueous emulsion polymerization are firstly homopolymers not processible from the melt, for example PTFE, secondly "modified" polymers, for example a polymer with more than about 99 mol % of tetrafluoroethylene (TFE) and an amount of comonomer(s) which is so low that the product retains its "not processible from the melt" character and thirdly low molecular weight "micropowder" dispersions which are processible from the melt, and fourthly copolymers, for example fluorinated thermoplastics or fluoroelastomers. The fluorinated thermoplastics include copolymers which are composed mainly of TFE and the amount needed of one or more comonomers to make the product processible from the melt, for example from 1 to 50 mol %, preferably from 1 to 10 mol %. Customary fluoromonomers, besides TFE, are vinylidene fluoride (VDF), other fluorinated olefins, such as chlorotrifluoroethylene (CTFE), in particular perfluorinated olefins having from 2 to 8 carbon atoms, such as hexafluoropropene (HFP), fluorinated ethers, in particular perfluorinated vinyl-alkyl ethers whose alkyl moieties have from 1 to 6 carbon atoms; for example perfluoro (n-propyl vinyl) ether (PPVE). Other comonomers which may be used are non-fluorinated olefins, such as ethylene or propylene. The resultant dispersions of polymers which are processible from the melt or not processible from the melt generally have a solids content of from 15 to 30% by weight. To achieve the abovementioned high solids content for application as a coating, and advantageously also for storage and transport, the solids content has to be increased by raising the concentration. Examples of methods used for this are raising the concentration thermally as in U.S. Pat. No. 3,316,201, decanting (U.S. Pat. No. 3,037,953) and ultrafiltration (U.S. Pat. No. 4,369,266).

The known emulsion polymerization mostly takes place within a pressure range from 5 to 30 bar and within a temperature range from 5 to 100° C. as described in EP-B-30 663, for example. The polymerization process for preparing PTFE-dispersions substantially corresponds to the known process for preparing fine resin powders, known as paste product (U.S. Pat. No. 3,142,665). The polymerization process for preparing copolymers, such as dispersions of fluorinated thermoplastics, corresponds to the process for preparing these materials in the form of melt pellets.

In all of these emulsion polymerizations an emulsifier is required which does not disrupt the polymerization by chain transfer. These emulsifiers are termed nontelogenic emulsifiers (U.S. Pat. No. 2,559,752). Use is mainly made of perfluorooctanoic acid (PFOA for example n-PFOA, CAS No. 335-67-1) in the form of ammonium and/or alkali metal salts. However, the abbreviation PFOA when used in the text below is not intended to exclude other fluorinated emulsifiers. The content of this emulsifier is generally within the range of 0.02 to 1% by weight, based on the polymer.

Occasionally, other fluorinated emulsifiers are used. For example, EP-A-822 175 describes the use of salts of $CH_2$-containing fluorocarboxylic acids for the emulsion polymerization of TFE. WO-A-97/08214 describes the use of 2-perfluorohexylethanesulfonic acid or salts thereof for TFE polymerization.

U.S. Pat. No. 2,559,752 describes other fluorinated emulsifiers, but these have not been widely used since their volatility is low. These chemicals can cause discoloration of the final products at high processing temperatures.

One of the greatest advantages of PFOA is its high volatility. PFOA is a very effective emulsifier and is practically indispensable due to its inertness in the polymerization reaction. However, PFOA is not biodegradable and has recently been classified as hazardous to the environment.

However, it is known that PFOA can be removed from exhaust gases (EP-B-731 081), and moreover advantageous processes for removing PFOA from wastewater have been described (U.S. Pat. No. 4,282,162 and the as yet unpublished German Patent Applications 198 24 614.5 and 198 24 615.3 filed Jun. 2, 1998).

In the techniques listed above for raising concentration, the majority of the PFOA remains in the polymer dispersion, even in the case of ultrafiltration or removal by decanting using a 100-fold excess of the nonionic emulsifier.

For instance, in the ultrafiltration of U.S. Pat. No. 4,369, 266 about 30% of the original PFOA content remains in the marketable dispersions. In specific cases the residual PFOA content can be reduced to below 10%, but the process is generally not cost-effective: achieving a reduction of this type requires addition of water and of a nonionic emulsifier to the dispersion whose concentration is to be raised. This gives unacceptably long process times.

During subsequent use of these dispersions, PFOA can pass into the environment, for example with the wastewater inevitably arising from cleaning the equipment, and into the atmosphere as aerosol. The latter emission is still more pronounced when coatings are produced, since PFOA and its ammonium salt are highly volatile. In addition, PFOA and its salts decompose by decarboxylation at the sintering temperatures normally employed, from 350 to 450° C., to give fluorinated hydrocarbons, which have a major global-warming effect ("greenhouse effect").

The present invention provides high solid dispersions essentially free of PFOA. In this invention, "essentially free" means a content of less than 100 ppm, preferably less than 50 ppm, especially less than 25 ppm and in particular less than 5 ppm. These values are based on the entire dispersion, and not just the solids content. This is achieved by removal of fluorinated emulsifiers, e.g. PFOA, from fluoropolymer dispersions, such as PTFE, fluorothermoplast or fluoroelastomer dispersions, via anion exchange, namely by adding a nonionic emulsifier to the fluoropolymer dispersion and contacting this stabilized dispersion with a basic anion exchanger. This process works without jamming or clogging the ion exchange bed by coagulated latex particles. The resulting dispersion may optionally be upconcentrated.

Fluoropolymer dispersions useful in this inventions include dispersions of homopolymers and copolymers of one or more fluorinated monomers, such as TFE, VDF or CTFE or other fluorinated olefins of 2 to 8 carbon atoms, perfluorinated olefins of 2 to 8 carbon atoms, e.g., HFP, fluorinated ethers, especially perfluorinated vinyl-alkyl ethers with alkyls of 1 to 6 carbon atoms, such as perfluoro-(n-propyl-vinyl) ether and perfluoro-(methyl-vinyl) ether. Useful comonomers also include non-fluorinated olefins, such as ethylene or propylene. This invention is intended to include such dispersions whether the resulting fluoropolymer is melt-processable or not.

The latex particles usually have a submicroscopic diameter of less than 400 nm and preferably from 40 to 400 nm. Smaller particle sizes may be obtained by what is known as "micro-emulsion polymerization." The latex particles are anionically stabilized by colloid chemistry methods. The anionic stabilization is provided by anionic endgroups, mostly COOH-groups, and by the anionic emulsifier, such as PFOA. Such anionically stabilized dispersions coagulate rapidly in an anion exchange bed and thus jam the ion exchange bed. The reason for that is the break down of the electrical double layer at the ion exchange sites. The treatment of an anionically stabilized dispersion with an anion exchanger is therefore considered to be technically not feasible, in particular for higher concentrations.

The impairing or clogging of the ion exchange bed is observed even at concentrations 1000 times lower than those of the raw polymer dispersions, that is to say of the dispersion after polymerization.

A helpful in choosing a useful ion exchanger is that the pKa value of the acid corresponding to the counterion of the anion exchanger has to be higher than the pKa value of the anionic endgroups of the polymer. Preferably, the anion exchanger has a counterion corresponding to an acid with a pKa value of at least 3.

In contrast, coagulation is observed after prolonged periods if the anion exchanger is in the $SO_4^{-2}$ or $Cl^-$ form even with dispersions of copolymers of TFE and HFP, called "FEP", and of TFE with PPVE, called "PFA". These copolymers both have strongly acidic endgroups. The formation of such endgroups is explained in "Modern Fluoropolymers", John Scheirs (Editor), John Wiley & Sons, Chichester (1997), pages 227 to 288, 244. The jamming or clogging of ion exchange beds when processing TFE-ethylene or VDF copolymer dispersions occurs almost instantly under such conditions.

Therefore, at the outset, the anion exchange is performed in an essentially basic environment. Preferably, the ion exchange resin is transformed to the OH⁻ form, but anions like fluoride or oxalate corresponding to weak acids can also be used. These anions are generally present in the dispersion and originate from the polymerization recipe.

The specific basicity of the anion exchanger used is not critical. Strongly basic resins are preferred due to the observed higher efficiency in removing PFOA. The effective removal of PFOA from the dispersions depends on the ion exchange conditions. Weakly basic ion exchange resins show earlier PFOA breakthrough. The same is true for higher flow rates.

The flow rate is not critical, standard flow rates can be used. The flow can be upward or downward.

The ion exchange process can also be carried out as a batch process by mildly stirring the dispersion with the ion exchange resin in a vessel. After this treatment the dispersion is isolated by filtration. Use of this invention will minimize coagulation during a batch process.

Non ionic emulsifiers are described in detail in "Nonionic Surfactants" M. J. Schick (editor), Marcel Dekker, Inc., New York 1967".

The choice of the nonionic emulsifier is also not critical. Alkylarylpolyethoxy alcohols, alkylpolyethoxy alcohols, or any other nonionic emulsifier can be used. This is a big advantage since the removal of PFOA from commercial dispersions leaves the formulation of the applied dispersions essentially unchanged.

No differences could be observed using nonionic surfactants such as alkylarylpolyethoxy alcohol type, e.g., Triton™ X100, or of alkylpolyethoxy alcohol type, e.g., GENAPOL™ X 080, with respect to effectiveness of the PFOA removal, flow rates, or jamming of the ion exchanger bed.

The removal of PFOA is preferably carried out with crude dispersions from polymerization. Such dispersions generally have a solid content of 15 to 30% by weight. Sufficient non-ionic emulsifier is added to provide dispersion stability during subsequent processing, such as concentration. A sufficient quantity of non-ionic emulsifier generally means from 0.5 to 15% by weight and preferably from 1 to 5% by weight. These percentages are based upon the solids content of the dispersion. After removal of the PFOA, the dispersions may be concentrated using conventional procedures, such as ultrafiltration or thermal concentration. It is advantageous that the concentration of the non-ionic emulsifier in the final product is not much higher than in comparable commercial products. The absence of PFOA in these processes does not impair the concentration process, that is, no more coagulum is formed than in presence of PFOA during thermal concentration and ultrafiltration.

The removal of PFOA via anion exchange can also be carried out with previously concentrated dispersions with a solids content of up to 70% by weight. However, due to the higher viscosity and density of such dispersions this process is technically more cumbersome. In this case the ion exchange is preferably operated by the upflow method, to avoid difficulties due to the flotation of the ion exchange bed. The high viscosity does not usually permit high flow rates. For such high solids dispersions the batch process appears to be more advantageous.

The removal of PFOA is carried out by adding typically 1 to 5% by weight of nonionic emulsifier to the dispersion under mild agitation conditions and passing the dispersion over the anion exchanger. The anion exchanger may be preconditioned with a solution of nonionic emulsifier as used with the dispersion to be exchanged. The anion exchange resin is preferably brought into the OH⁻ form. This is accomplished by bringing the anion exchange resin into contact with an NaOH solution.

Dispersions are generally used for the ion exchange process without adjusting the pH value but the pH value may be increased to enhance the colloidal stability of the dispersion by adding a base, such as aqueous ammonia or sodium hydroxide solution. A pH value in the range of 7 to 9 is sufficient. The increased pH value does not greatly affect the efficiency of the removal of PFOA. This is believed to be due to the fact that PFOA is not only exchanged but also strongly absorbed on the ion exchange resin.

Subsequently the ion exchanged dispersions are subjected to concentration, preferably using thermal concentration or ultrafiltration. No impairment of these processes could be observed. There are moreover no changes in end user processing or end use properties for such dispersions according to the invention.

The anion exchange process in the presence of a non ionic emulsifier without jamming of the ion exchange bed, can be successfully used for the removal of any other anionic emulsifier used in any polymerisation process.

This process may also be used for any crude fluoropolymer dispersions, such as dispersions of PFA, FEP, THV (THV is a terpolymer of TFE, HFP VDF), ET (ET is a copolymer of TFE and ethylene), TFE/P (a copolymer of TFE and propylene), copolymers of VDF and HFP, as well as homopolymers or copolymers comprising other fluorinated olefins or vinyl ethers. These polymers are described in detail in "Modern Fluoropolymers" cited above.

The work up procedure as disclosed in U.S. Pat. No. 5,463,021 describes inter alia, a treatment of crude THV dispersions via an ion exchange process as one work up step. However, this is a cationic exchange process to remove manganese ions originating from the permanganate used as polymerization initiator. During the cationic exchange process the stabilizing electrical double layer is not affected because the latex particles are anionically stabilized.

The invention will now be explained in more detail by the following examples.

Experimental Details:

All percentages are by weight unless otherwise stated.

Determination of PFOA

The PFOA content of the anion exchanged dispersion may be quantitatively analyzed using the method described in "Encyclopedia of Industrial Chemistry Analysis", Vol. 1, pages 339 to 340, Interscience Publishers, New York, N.Y., 1971 and in EP-A 194 690. Another method used is the conversion of the PFOA to the methyl ester and analysis the ester content by gas chromatography using an internal standard. The detection limit for PFOA for the latter method is 5 ppm. The latter method was used in the following examples.

Anion Exchange

Standard equipment was used. The dimensions of the column were 5×50 cm. AMBERLITE™ IRA 402 with a capacity of 1.2 meq/ml was used as strong basic anion exchange resin (AMBERLITE is a Trademark of Rohm & Haas). The bed volume was usually 400 ml. The ion exchanger was brought into the OH⁻ form with NaOH solution. The exchanger was preconditioned with a 5%-solution of the non ionic emulsifier. The ion exchange was carried out at room temperature. The experiments were performed at different flow rates as given in Table 1. The non ionic emulsifier was added to the dispersions as a 10% concentrated solution. The content was varied as given in Table 1. The values are based on the polymer content. The technical feasibility of this process is considered to have been achieved if at least 5% of the theoretical capacity of the ion exchange resin used is consumed by the PFOA containing dispersion without jamming of the bed and without breakthrough of PFOA.

The following nonionic surfactants were used:

NIS 1: octyl phenoxy polyethoxy ethanol (commercial product TRITON™ X100,

TRITON is a Trademark of Union Carbide Corp.).

NIS 2: ethoxylate of a long-chain alkanol (commercial product GENAPOL™ X080,

GENAPOL is a Trademark of Hoechst AG).

EXAMPLES 1 to 7

All experiments were carried out with AMBERLITE IRA 402 in the OH⁻ form. Changes to the preconditioning of the anion exchange resin with an aqueous solution of the non ionic surfactant were as indicated in Table 1.

The fluoropolymer dispersion was obtained by homopolymerization of TFE according to EP-B 30 663. The solids content of the crude dispersion used is about 20%, and the average particle size is about 200 to 240 nm. The pH value is 7. The amount and type of the non ionic emulsifier added to the crude dispersion were changed as indicated in Table 1.

The PFOA content of the dispersion is about 0.13% by weight (amounting to 3.14 mmol/kg dispersion). This corresponds to 2.7 ml of ion exchange resin per kg of crude dispersion. Example 3 shows that 54 ml of the total volume of 400 ml ion exchange resin are consumed. Thus, the ion exchange capacity provided was a more than 5-fold excess for all examples.

The experimental details in Table 1 show different flow rates. During a given experiment no changes in the flow rate were observed. This is an indication of the absence of jamming of the ion exchange bed. The run time of the experiments was up to 67 h without interruption. All the examples result in dispersions with PFOA contents of less than 5 ppm, the analytical detection limit of the method used.

TABLE 1

| Example No. | 1 | 2 | 3 | 4 | 5 | 6 | 7 |
| --- | --- | --- | --- | --- | --- | --- | --- |
| Ion exchange resin, ml | 400 ml | 400 ml | 400 ml | 4 parallel columns 400 ml each | 4 parallel columns 400 ml each | 400 ml | 400 ml |
| Ion exchange resin conditioned with an aqueous solution of | 1 weight-% NIS 1 | 5 weight-% NIS 1 | 3 weight-% NIS 1 | 5 weight-% NIS 1 | 5 weight-% NIS 2 | 5 weight-% NIS 2 | 1 weight-% NIS 2 |
| Raw dispersion: | | | | | | | |
| Solid content of | 22.7% | 22.6% | 22.7% | 22.7% | 22.5% | 23% | 22.8% |
| PFOA content | 0.132% | 0.130% | 0.132% | 0.136% | 0.138% | 0.138% | 0.136% |

TABLE 1-continued

| Example No. | 1 | 2 | 3 | 4 | 5 | 6 | 7 |
|---|---|---|---|---|---|---|---|
| Raw dispersion | | | | | | | |
| Stabilized with *) | 1% NIS 1 | 3% NIS 1 | 4% NIS 1 | 5% NIS 1 | 5% NIS 2 | 4% NIS 2 | 1% NIS 2 |
| Amount passed through | 5 kg | 19 kg | 20 kg | 40 kg | 50 kg | 18 kg | 8 kg |
| Flow rate | 0.5 l/h | 0.6 l/h | 0.3 l/h | 0.6 l/h | 0.6 l/h | 0.6 l/h | 0.5 l/h |
| Run time | 10 h | 35 h | 67 h | 17 h | 21 h | 30 h | 16 h |
| Jamming yes/no | No | no | no | no | no | no | no |
| Ion exchanged dispersion | | | | | | | |
| PFOA content | <5 ppm | <5 ppm | <5 ppm | <5 ppm | <5 ppm | <5 ppm | <5 ppm |

*) based on solid content of the dispersion

EXAMPLE 8

800 ml of AMBERLITE IRA 402 (OH⁻ form, preconditioned with a 5%-solution of NIS 1) were slowly added to a stirred vessel containing 20 liters of dispersion similar to that used in examples 1 to 7, but concentrated by ultrafiltration (solids content: 52.5%, PFOA content: 0.065%, NIS 1 content: 5% based on polymer content). After mild stirring for 8 h at room temperature the anion exchanger was filtered off and the PFOA content of the dispersion was analyzed resulting in less than 5 ppm PFOA.

EXAMPLE 9

The same procedure as for examples 1 to 7 was used for purification of a PFA crude dispersion. 400 ml of AMBERLITE IRA 402 (OH⁻ form, preconditioned with 1%-solution of NIS 2) were used. The PFA dispersion (1500 ml, solid content 20%) was stabilized with 5% by weight of NIS 2 based on the solid content of the dispersion. This dispersion contained 0.066% by weight of PFOA and showed a pH value of 4. The dispersion was passed over the anion exchange bed with a flow rate of 100 ml/h. This corresponds to a run time of 15 h. No jamming of the bed was observed and the resulting dispersion showed a PFOA content of <5 ppm.

EXAMPLE 10

Example 9 was repeated using a crude FEP dispersion (solid content 20% by weight, PFOA content 0.08% by weight) stabilized with 5% by weight of NIS 2. The ion exchange process resulted in an FEP dispersion containing <5 ppm of PFOA. No jamming of the bed was observed.

EXAMPLE 11

Example 9 was repeated but with a THV dispersion having a solids content of 20% and an average particle size of 80 nm. Before subjecting the dispersion to the anion exchange it was treated with a cation exchange resin as described in U.S. Pat. No. 5,463,021. The anion exchange process resulted in a THV dispersion containing <5 ppm of PFOA and no jamming of the bed was observed.

What is claimed is:

1. A process for removing fluorine-containing emulsifier from an aqueous fluoropolymer dispersion comprising adding to the dispersion a nonionic emulsifier to stabilize the dispersion, contacting the stabilized dispersion with an anion exchange resin and separating the dispersion from the anion exchange resin, wherein the separated dispersion is essentially free of fluorine-containing emulsifier.

2. The process as claimed in claim 1, wherein the solids content of the said dispersion is 10 to 70% by weight.

3. The process as claimed in claim 1, wherein the stabilized dispersion is contacted with the anion exchange resin in a basic environment.

4. The process as claimed in claim 1, wherein from 0.5 to 15% by weight of nonionic emulsifier is added, based on the weight of the solids content of the dispersion.

5. The process as claimed in claim 1, wherein the anion exchange resin has a counterion corresponding to an acid with a pKa value of at least 3.

6. The process as claimed in claim 1, wherein the anion exchange resin is used in the hydroxyl form.

7. An article comprising an aqueous fluoropolymer dispersion prepared according to claim 1.

8. An article comprising a coating of an aqueous fluoropolymer dispersion prepared according to claim 1.

9. The process as claimed in claim 1, further comprising upconcentrating the separated dispersion.

10. The process as claimed in claim 9, wherein the separated dispersion has a solids content of about 70% by weight or less.

11. The process as claimed in claim 1, wherein said contacting step and said separating step are accomplished continuously through an anion exchange resin bed.

12. The process as claimed in claim 1, wherein said contacting step is accomplished in a batch process and the anion exchange resin and the dispersion are subsequently subjected to said separating step.

* * * * *